United States Patent [19]

Long et al.

[11] 3,984,284

[45] Oct. 5, 1976

[54] SPACER CAPTURE SYSTEM FOR NUCLEAR FUEL ASSEMBLIES

[75] Inventors: John W. Long; Barney S. Flora, both of Richland, Wash.

[73] Assignee: Exxon Nuclear Company, Inc., Bellevue, Wash.

[22] Filed: Aug. 3, 1973

[21] Appl. No.: 385,312

[52] U.S. Cl. ............................ 176/68; 176/78; 176/81
[51] Int. Cl.² ........................................ G21C 3/12
[58] Field of Search ........................ 176/68, 78, 81

[56] References Cited
UNITED STATES PATENTS

| | | | |
|---|---|---|---|
| 3,185,632 | 5/1965 | Bradley | 176/68 |
| 3,297,540 | 1/1967 | Williams et al. | 176/78 |
| 3,736,227 | 5/1973 | Nakazato | 176/78 |
| 3,791,466 | 2/1974 | Patterson et al. | 176/78 |
| 3,802,995 | 4/1974 | Fritz et al. | 176/81 |

*Primary Examiner*—Stephen C. Bentley
*Attorney, Agent, or Firm*—Harold N. Wells; R. D. Hantman

[57] ABSTRACT

A spacer capture system for nuclear fuel assemblies of the type in which fuel rods are disposed in parallel array between supporting end plates. At intervals along the fuel rods spacer grids are provided which properly position the fuel rods, reducing vibration and obtaining proper spacing to assure uniform heat removal from the fuel rods during operation. The spacers hold the fuel rods by spring pressure against protrusions formed from the side walls of the grids. The spacers are held in the proper position against vibration and the force of water passing adjacent the tubes by lugs provided on special fuel containing spacer capture rods which engage the protrusions on each spacer and thereby preventing its longitudinal movement relative to the fuel rods. The lugs are so mounted as to permit freeing of the spacer capture rods by a 45° rotation of the spacer capture rods and conversely, the spacers may be locked in position by a 45° rotation of the spacer capture rods from the unlocked position. In a region in which the locking lugs are provided, inert material replaces the nuclear fuel material in order to avoid overheating of the tubes.

9 Claims, 6 Drawing Figures

U.S. Patent Oct. 5, 1976 3,984,284
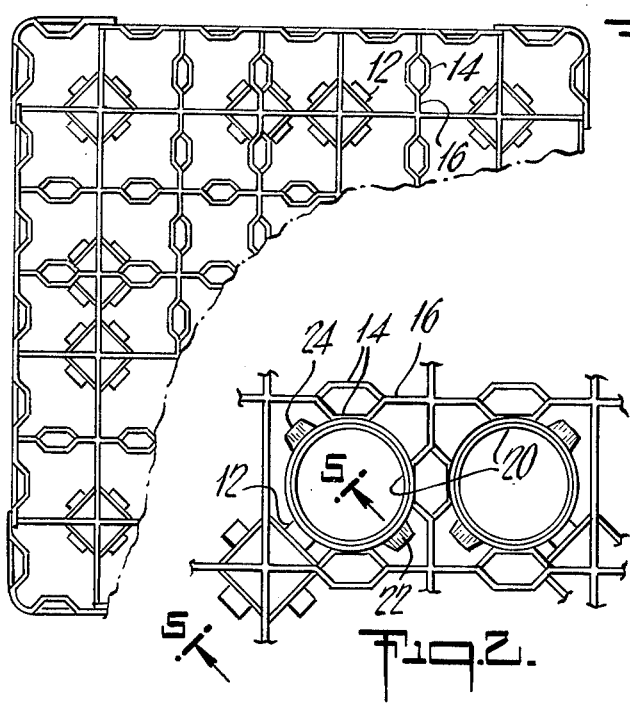
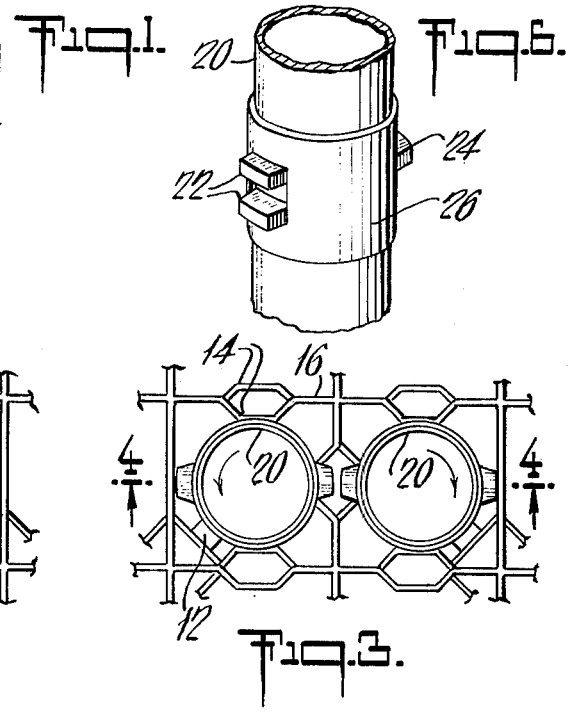
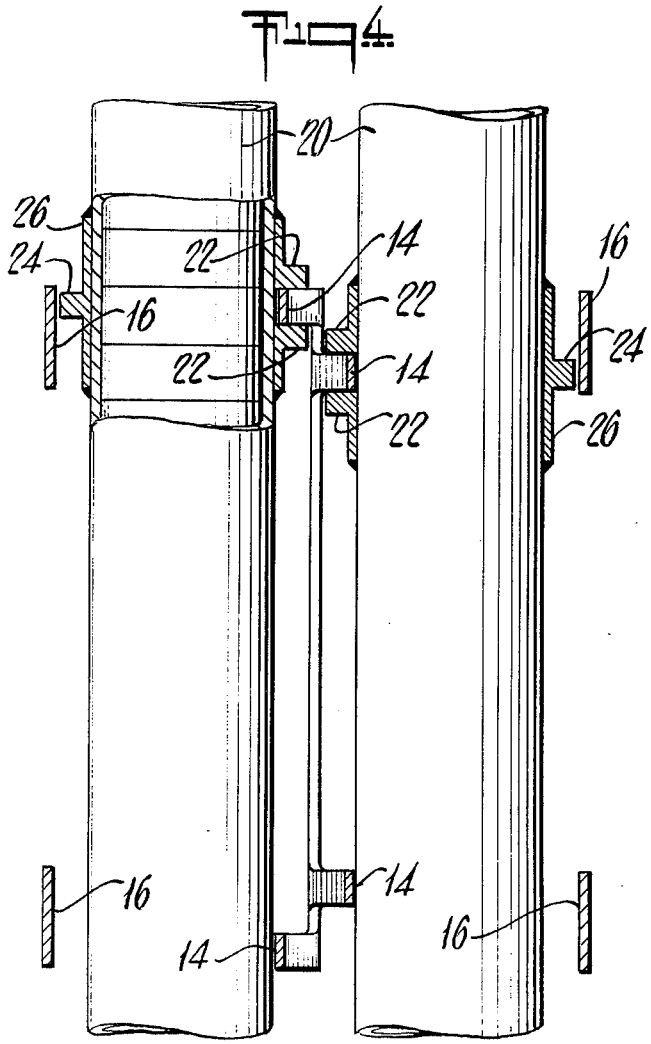
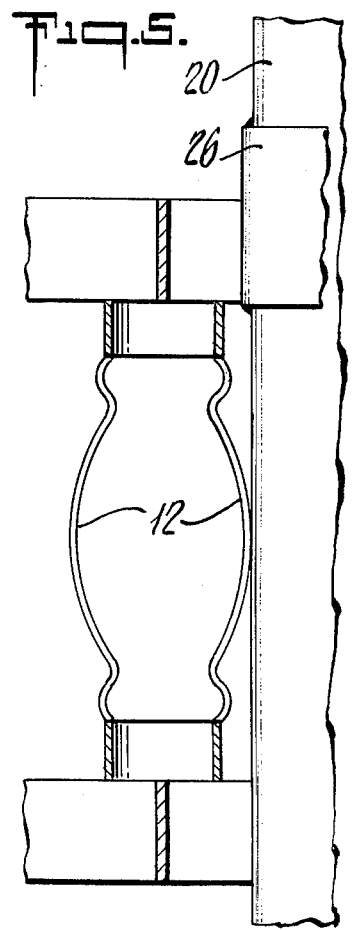

SPACER CAPTURE SYSTEM FOR NUCLEAR FUEL ASSEMBLIES

BACKGROUND OF THE INVENTION

The present invention is related to nuclear reactor fuel bundles such as are used in reactors of the pressurized water or boiling water type. In such bundles, fissionable fuel is disposed within tubular fuel rods which are mounted in parallel array between a pair of end plates. When the bundle is in service in a nuclear power reactor, water passes upwardly along the outer surface of the fuel rods, receiving heat therefrom owing to the reaction occurring inside. In order to permit uniform heat removal and to avoid overheating of the tubes, it is necessary that they be accurately spaced. Maintaining the spacing of the elongated tubes in such a closely spaced array, under conditions in which vibration naturally occurs, requires a carefully designed spacer unit which has been the subject of many prior art patents. In particular, the present invention relates to the spacer described in application Ser. No. 223,528 filed Feb. 4, 1972, and jointly assigned to the assignee of the present invention. Accordingly, the earlier application is incorporated by reference into the present application.

In the preferred spacer design of the reference application, a corner mounted spring engages the side of fuel rods passing through each of the grid openings formed by the spacer and holds the fuel rod against protrusions which have been formed from the grid walls. This three-point engagement provides a stable positioning of the fuel rod within the spacer. In a typical fuel bundle there are a plurality of spacers disposed along the length of the fuel rod. In order to assure proper positioning during operation, the spacers must be secured in the desired position; otherwise, they may be displaced upwardly owing the vibration and to the flow of water adjacent the tubes. In the prior art, such spacers have been held in position by special spacer capture rods. These fuel rods are of special sectional construction which are joined by connectors which engage the spacers and hold them in position. Such construction is difficult and expensive to fabricate and increases the possibility of failure of these rods. The present invention overcomes these disadvantages, providing a simpler construction which is less expensive to fabricate and easier to assemble.

SUMMARY OF THE INVENTION

The spacer capture system of the present invention comprises special spacer capture rods which duplicate conventional fuel rods with two exceptions. First, at positions where the spacer capture device is to be positioned, inert material is used to fill the fuel rod in order to avoid localized overheating due to the increase in thermal resistance of the wall. Second, lugs are provided at the outer wall of the spacer capture rods in the regions adjacent the inert material. These lugs engage the protrusions against which the fuel rods are urged by the corner mounted spring members of the grid spacer. In the preferred embodiment, lugs are mounted in 180° positions on the exterior of the spacer capture rods which permits them to be passed through the grid spacer without interference of the protrusions. Once in proper position, the spacer capture rods are rotated 45° until the capture lugs engage the protrusions on the grid spacer, thereby securing the grid spacer in position relative to the capture rod and to the fuel bundle. A separate lug mounted 180° out of phase with the engaging lugs provides a standoff against the opposite grid wall.

BRIEF DESCRIPTION OF THE DRAWINGS

FIG. 1 is a partial plan view of a grid spacer associated with the capture system of the present invention.

FIG. 2 is an enlarged sectional view of the grid spacer of FIG. 1 illustrating the spacer capture system disengaged.

FIG. 3 is view corresponding to FIG. 2 in which the spacer capture system of the present invention is engaged.

FIG. 4 is a sectional view taken substantially along line 4—4 of FIG. 3.

FIG. 5 is a sectional view taken substantially along line 5—5 of FIG. 2.

FIG. 6 is a perspective view of the embodiment of FIG. 4.

DESCRIPTION OF THE PREFERRED EMBODIMENT

FIG. 1 illustrates in a plan view the grid spacer 10 with which the capture system of the present invention is associated. This grid spacer is described and illustrated in more detail in the referenced application, Ser. No. 223,528. A feature of the grid spacer system is the corner mounted spring 12 unit which engages fuel rods passing through each of the openings formed by the grid spacer urging the fuel rod against protrusions 14 which are formed from the walls 16 of the grid spacer. This three-point contact with a single spring holds the fuel rod securely minimizing vibration, and ensuring correct positioning of the fuel rod. Since in an assembled fuel bundle, water is flowing at a high velocity through the openings 18 in the grid spacer and around the tubes which pass therethrough, it will be appreciated that the force of the flowing water and the vibrations which it causes could displace the grid spacer 10 in an upward direction. In order to ensure that the fuel rods remain properly spaced by preventing movement of the grid spacers, the capture system of the present invention is provided.

The protrusions 14 from the walls of the grid spacer 10 provide a means for holding the fuel rods if engaging lugs are provided on the spacer capture rods. Such lugs may be mounted directly on the rod or, in the preferred embodiment, mounted on a cylindrical sleeve which is placed about the capture rod. The engagement of these lugs is illustrated in FIGS. 2 and 3. FIG. 2 shows the spacer capture rods 20 in position within the grid spacer 10 but disengaged from the spacer. In this position, either the rod 20 or the grid spacer 10 could be moved longitudinally relative to the rod (although not laterally). During the assembly of the fuel bundle, it is common for the grid spacers 10 to be fixed in position and the tubes inserted one by one until the bundle is complete. Thus FIG. 2 may be viewed as representing a stage of the assembly in which a spacer capture rod 20 has been inserted within the grid spacer 10 but not yet engaged. Once in proper position, the spacer capture rod 20 will be rotated 45° as shown in FIG. 3, bringing the engaging lugs 22 into contact with the protrusions 14 on the grid wall 16. This engagement of the lugs 22 with protrusions 14 locks the grid spacer 10 in position relative to the spacer capture rod. An additional lug 24 is provided in a 180° position away from engaging lugs 22 so as to provide a standoff against the opposite wall of the grid spacer.

The grid spacer is shown in a sectional elevation view in FIG. 4 in which it can be seen that the protrusion 14 which has been formed from the grid spacer wall 16 has engaged the lugs 22. In this embodiment, a collar 26 is placed about the spacer capture rod 20 which mounts the engaging lugs 22. The standoff lug 24 assists in the spacing of the tubes by touching the opposite spacer wall. It will be seen that owing to the mode of formation of the protrusions 14 it is necessary for adjacent spacer capture rods, if they are used, to be mounted with the lugs at slightly displaced longitudinal positions. Ordinarily, however, this would not be necessary owing to a relatively few spacer capture rods which are required.

Either in the preferred embodiment, or in the alternative embodiment, the presence of the engaging lugs 22 would create an increase in heat transfer resistance through the rod wall which could cause a localized hot spot and an eventual failure of the tube at that location. Accordingly, it is also part of the invention for such a capture rod 20 to be loaded so that no fuel is present in the region in which the spacer capture rods 20 are placed. Instead inert spacers are used within the spacer capture rod 20 in this region.

FIG. 5 illustrates the corner mounted spring unit 12 which engages the spacer capture rod 20 (or the conventional fuel rod), pressing it against two protrusions 14 on adjacent walls 16 of the grid spacer 10, providing a three-point contact which produces an efficient engagement of the fuel rods or spacer capture rods to the grid spacer.

FIG. 6 illustrates in a perspective view the preferred embodiment of the invention in which the engaging lugs 22 and standoff lug 24 are provided 180° apart on a cylindrical collar 26 which surrounds the spacer capture rod 20. It is within this collar region that inert materials would be placed within the rod in order to avoid localized overheating. It can be seen that in order to avoid movement of the rod in either longitudinal direction, lugs are provided on either side of the protrusion from the spacer wall and prevent movement of the spacer in either direction. The standoff lug 24 may be single since it does not engage the protrusions and does not prevent longitudinal movement of the spacer.

The foregoing description of the preferred embodiment is for information and illustration only, and should not be taken as limiting the scope of the invention which is defined by the claims which follow.

What is claimed is:

1. In a nuclear fuel bundle having a parallel array of fuel rods and a grid spacer having intersecting walls forming openings through which said fuel rods longitudinally extend with protrusions and coacting spring means extending from said walls of said grid spacer for holding said fuel rods in laterally fixed positions, a spacer capture system which secures said grid spacer in fixed position comprising:
   a. at least one hollow fuel containing spacer capture rod included in said parallel array of fuel rods positioned within said grid spacer;
   b. a pair of engaging lugs for engaging one of said protrusions extending radially from the exterior surface of said spacer capture rod and mounted longitudinally on said spacer capture rod so as to position said protrusion from said grid spacer walls between said pair of lugs and thereby prevent movement of said grid spacer in either longitudinal direction;
   c. a standoff lug extending radially from the exterior surface of said spacer capture rod and positioned 180° from said engaging lugs and of sufficient length to be disposed in surface contact with said spacer grid wall opposite said protrusions.

2. The spacer capture system of claim 1 wherein said engaging lugs and standoff lug are fixed directly to said spacer capture rod.

3. The spacer capture system of claim 1 wherein said engaging lugs and standoff lug are mounted on a collar surrounding and attached to said spacer capture rod.

4. The spacer capture system of claim 2 wherein said spacer capture rod is filled with inert material in the region adjacent said engaging lugs and standoff lug, thereby preventing localized overheating of said rod.

5. The spacer capture system of claim 3 wherein said spacer capture rod is filled with inert material in the region adjacent said collar, thereby preventing localized overheating of said rod.

6. The spacer capture system of claim 1 including only one standoff lug.

7. The spacer capture system of claim 3 wherein said capture rod includes inert material in the region adjacent said collar, thereby preventing localized overheating of said rod.

8. The spacer capture system of claim 1 including only one pair of engaging lugs.

9. The spacer capture system of claim 8 including only one standoff lug.

* * * * *